United States Patent [19]

Humburg

[11] Patent Number: 5,189,991
[45] Date of Patent: Mar. 2, 1993

[54] SOLENOID DISTRIBUTING VALVE FOR VOLUME FLOW CONTROL

[75] Inventor: Michael Humburg, Göppingen, Fed. Rep. of Germany

[73] Assignee: J. Ebers Pächer, Esslingen, Fed. Rep. of Germany

[21] Appl. No.: 806,736

[22] Filed: Dec. 12, 1991

[30] Foreign Application Priority Data

Dec. 28, 1990 [DE] Fed. Rep. of Germany ....... 4042084

[51] Int. Cl.⁵ .................... F16K 31/06; F16K 11/044; F01P 7/14
[52] U.S. Cl. ................ 123/41.1; 251/129.1; 137/625.48
[58] Field of Search ............ 251/129.1; 137/625.48; 123/41.1

[56] References Cited

U.S. PATENT DOCUMENTS

| 1,434,637 | 11/1922 | Tuck | 251/129.1 X |
| 1,523,759 | 1/1925 | Dougherty, Jr. | 251/129.1 X |
| 1,783,515 | 12/1930 | Montgomery | 251/129.1 X |
| 4,165,762 | 8/1979 | Acar | 251/129.1 X |

FOREIGN PATENT DOCUMENTS

| 512449 | 11/1930 | Fed. Rep. of Germany | 137/625.48 |
| 1033473 | 7/1958 | Fed. Rep. of Germany | 251/129.1 |
| 0207584 | 12/1983 | Japan | 137/625.48 |
| 0859787 | 9/1981 | U.S.S.R. | 137/625.48 |

Primary Examiner—Arnold Rosenthal
Attorney, Agent, or Firm—McGlew and Tuttle

[57] ABSTRACT

Electric switching solenoid valve (1) with a valve piston (9) guided in a valve housing (12), which valve piston (9) can be moved from one switching position to another switching position by a magnet armature (18) arranged in an electric coil (15). The coil (15) has coil areas (16, 17) assigned to the various switching positions of the solenoid valve (1). The coil areas are acted on by the current only during the switching operation, and the valve piston (9) is protected in the particular switching position reached by at least one holding device (19) arranged in the valve housing (12).

12 Claims, 3 Drawing Sheets

SOLENOID DISTRIBUTING VALVE FOR VOLUME FLOW CONTROL

FIELD OF THE INVENTION

The present invention pertains to an electric switching solenoid valve with a valve piston guided in a valve housing, which valve piston can be moved in at least two positions by means of an armature arranged in an electric coil.

BACKGROUND OF THE INVENTION

Distributing valves equipped with a solenoid form essential components of units designated for controlling and regulating fluids. In the simplest case, such distributing valves are also designed as 2/2-distributing valves, in which the connection between an outlet and an inlet of the distributing valve is released or closed via a corresponding switching position of a valve sealing element, as a rule, a valve piston. The corresponding on or off position of the valve can now be influenced by the solenoid in such a way that, with a current-carrying solenoid, the valve piston which is designed as a magnet armature at least in one partial area, is moved from one switching position into another switching position against the action of a spring. When the solenoid is switched off, the valve piston is moved back into the original outlet switching position as a result of the spring restoring forces. It follows from this that, due to the restoring forces of the spring acting permanently on the valve piston, the valve piston must be held at least in one switching position by the forces exerted on it by the solenoid; thus, the solenoid must be permanently acted on by the current in one switching position in order to guarantee a safe valve function. Thus, a considerable power consumption can be obtained for the solenoid according to the type and frequency of the switching position.

SUMMARY AND OBJECTS OF THE INVENTION

It is an object of the present invention to produce an electric switching solenoid valve of the type mentioned above, which, independent of the switching position, is distinguished by a low power consumption, but nevertheless guarantees a safe valve function in each switching position.

To solve this task, the solenoid valve according to the present invention is characterized in that the coil has coil areas which are assigned to the various switching positions of the solenoid valve and are acted on by the current only during a switching operation, and the valve piston is protected by at least one holding device arranged in the valve housing in the switching position reached.

The basic idea of the invention is to produce, by separating the switching and holding functions, an electric switching solenoid valve, whose solenoid, formed by a current-carrying coil, only requires electric power during the actual switching operation, and to make possible the holding function for the safe holding of the valve piston in a switched position (one of two or more switching position) by means of an electrically independent, separate holding device. For this purpose, the coil is divided into individual coil areas which are assigned to the possible switching positions of the solenoid valve. The coil sections thus produced can be electrically activated independently of one another such that the magnet armature acting on the valve piston is aligned corresponding to the particularly activated coil section, and thus, the accompanying switching position of the valve piston is adjusted. After the desired switching position is reached, the current can be switched off since the valve piston is held by a current-independent holding device to guarantee the safe valve function in the switching position reached. When the valve piston is transferred from one switching position to another switching position, the force exerted by the solenoid on the magnet armature of the valve piston opposes the force exerted by the holding device on the valve piston and moves the valve piston into the new switching position. In this switching position, the valve piston is then again held by a corresponding, acting holding device.

According to a preferred embodiment, the solenoid valve according to the present invention is designed as a 3/2-distributing valve, with the coil then having two coil areas assigned to both switching positions of the solenoid valve. To form the two coil areas, the coil is divided into two coil sections that can be electrically connected to one another, with one coil area assigned to a first switching position being formed by a coil section and the coil area assigned to the second switching position being formed by the electric connection of both coil sections. An especially compact structure of the coil is made possible by this "overlapping" formation of the coil areas. With the formation of coil areas independent of one another, an altogether essentially larger coil would result due to the minimum size of the coil areas necessary for producing the magnetic force.

According to an advantageous feature of the invention, the holding device is designed as a mechanical holding device. As a result of this, the holding device is independent of an external, especially electric power supply. Of course, it is also conceivable that the holding device is achieved by the suitable installation in the valve housing of permanent magnets which act together with a corresponding permanent magnet arranged on the valve piston.

In a preferred embodiment, the mechanical holding device is essentially formed from a spring element acting between the valve housing and the valve piston. In this case, the coupling points of the spring element are selected such that, when the valve piston proceeds from one switching position to another switching position, the spring element is deviated from a stable position, locating the particular switching position, over an unstable central position to another stable position for maintaining the new switching position. By means of the special type of coupling of the spring element, it is thus possible to protect the valve piston in both switching positions with only one holding device.

For the formation of the holding device, the spring element can be designed as a tension spring which is connected with its one end on the valve housing and with its other end connected to a pivoted lever coupled on the valve housing which with its free end is coupled to the valve piston via a slide ring connection. By doing this, as a result of a deviation in the spring alignment from the unstable central position, the spring force acts on the pivoted lever such that the lever torque, occurring as a result of the coupling of the pivoted lever on the valve housing, serves to protect the valve piston in a switching position. In this embodiment of the mechanical holding device, the use of a simple tension spring as a spring element serving to protect both switching positions is made possible by the action of the pivoted lever.

In a variant of the mechanical holding device, the spring element consists of two leaf springs which are arranged in opposing directions and coupled with their ends on a common coupling point on the valve housing as well as on the valve piston. By this means, it is advantageously possible to provide the holding device with a structure that is as simple as possible but nevertheless guarantees an operationally safe function.

A further embodiment possibility of the mechanical holding device consists in the use of a compression spring as the spring element. In this case the insertion of the compression spring in a buckling sleeve is necessary in order to prevent the compression spring from buckling and thus to guarantee the required necessary function of the holding device.

For the optional activation of one or both coil sections of the solenoid valve, an electric circuit design is provided, in which the coil is integrated with one or both coil sections in a switching circuit according to the desired switching position. The switching circuit has, in addition to a power source, a selective switch and a push button, with the selective switch making the optional activation of one or both coil sections possible, and the push button making the sufficient, brief closure of the electric circuit for the function of the solenoid valve possible.

By providing the magnetic field according to the present invention with two inlets and one outlet, there is the possibility of using the solenoid valve for controlling coolant flows in a coolant circulation of an internal combustion engine for motor vehicles provided with a heating device. By means of this, the magnetic field according to the present invention can then serve as the optional control of the coolant flow, heated by the heating device, through the internal combustion engine or through a by-pass line by-passing the internal combustion engine. The solenoid valve according to the present invention thus makes it possible--apart from the actual switching operations--to control the coolant flow without electric power supply. This is especially important in the application of the solenoid valve in motor vehicles since in this case, as a rule, only the limited electric capacity of the vehicle battery is available for the power supply.

The application of the solenoid valve according to the present invention in trucks used as long-distance trailer-trucks proves to be especially advantageous. In these trucks which, as a rule, are provided with a cab with a bunk, a permanent control of the coolant current is necessary for the exclusive heating of the vehicle interior for a lengthy period (e.g., an overnight stay). If the solenoid valve according to the present invention is used for the corresponding volume flow control, the vehicle battery is not charged independently from the switching position of the solenoid valve.

Moreover, it is also possible to design the solenoid valve according to the present invention as a thermostatic valve, with the valve piston being designed as a valve-elastic material component.

Through the coil sections of the coil of the solenoid valve, which coil sections can be independently acted on by the current according to the present invention, the thermostatic valve can be moved in two extreme positions independent of the situation of the valve-elastic material component. Thus, if necessary, the thermostatic valve can be overdriven, independent of the control temperature of the thermostatic valve, for example, when the coolant current should be guided exclusively through the internal combustion engine or through the by-pass line by-passing the internal combustion engine.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DETAILED DESCRIPTION OF THE PREFERRED EMBODIMENT

Figure 1:
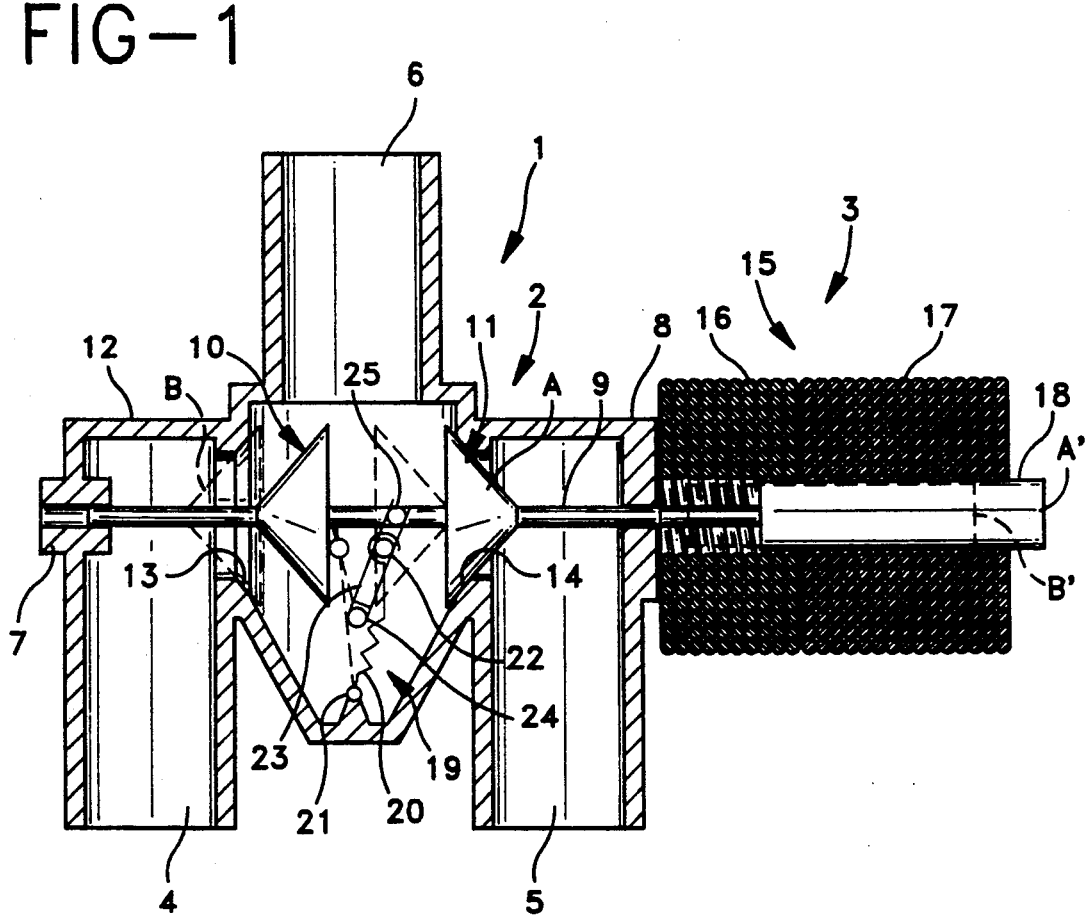
FIG. 1 is a schematic representation of a solenoid valve designed as a 3/2-distributing valve.

FIG. 1 shows a solenoid valve 1, which essentially consists of a 3/2-distributing valve 2 with a solenoid 3 flange-mounted on it. The 3/2-distributing valve 2 has two possible switching positions A and B, which serve for the optional connection of an inlet 4 or 5 to an outlet 6. The switching positions A and B are reached by a corresponding position change of a valve piston 9 guided in bearings 7 and 8 in the 3/2-distributing valve 2. The valve piston 9 is designed as a double valve piston and has two conical nipples 10, 11, which serve as the sealing unit on conical seats 13, 14 arranged in the valve housing 12.

In the switching position A, the valve piston 9 seals the inlet 5 of the 3/2-distributing valve 2 against its outlet 6 by the installation of its conical nipple 11 in the conical seat 14. In this switching position, the valve path between the inlet 4 and the outlet 6 is released such that a medium flowing through the inlet 4 into the 3/2-distributing valve can leave the valve through the outlet 6. The switching position B of the valve is shown in a simplified manner in FIG. 1 by a broken line of the positions which the conical nipples 10, 11 take in the switching position B. In the switching position B, accordingly, the inlet 4 is closed opposite the outlet 6 by the sealing installation of the conical nipple 10 in the conical seat 14, such that a free connection between the inlet 5 and the outlet 6 is obtained.

The switching positions A and B are achieved when the solenoid 3 is acted on by a corresponding current. The solenoid 3 essentially consists of a coil 15 which is divided into two coil sections 16, 17.

The coil-sided terminal area of the valve piston 9, designed as a magnet armature 18, is arranged in the interior of the coils 15. When the coil section 17 is acted on by the current or when an entire coil, formed from the coil section 16 and the coil section 17, is acted on by the current, the magnet armature 18 is aligned centrally to the coil area acted on by the current as a result of the magnetic field produced. To obtain the switching position A of the valve piston 9, only the coil section 17 is acted on by the current. As a result of this, the magnet armature 18 is aligned in the position designated as A'. In this position, the armature is arranged centrally to the coil section 17 corresponding to the equilibrium of forces thus formed in the magnetic field of the coil section 17. The position B' of the magnet armature 18 corresponds to the switching position B of the valve piston 9. This alignment of the magnet armature 18 is obtained by the entire coil 15, formed from the coil sections 16 and 17, being acted on by the current.

In order to interrupt the current supply after reaching the switching positions A or B (depending upon the supply of current to the coil section 17 or the entire coil 15, formed from the coil sections 16 and 17) a holding device 19 is provided which forces the valve piston 9 to remain in the switching position A or B reached. The holding device 19 exerts the necessary sealing force on the conical nipple 10 or 11 for the safe sealing of the conical seats 13, 14. The holding device 19 essentially consists of a tension spring 20 which is coupled with its one end in a coupling point 21 with the valve housing 12 and with its other end on a pin of a pivoted lever 23. The pivoted lever 23 is pivotably stored with one end on a swivel axis 24 arranged vertically to the plane of projection in the valve housing 12. With its other end, the pivoted lever 23, ending in the shape of a fork, is guided on a pin 25 of the valve piston 9 in the manner of a slide ring connection.

A torque acts around the axis 24 by means of the tension force of the spring acting on the pin 22. This torque secures the valve piston 9 in the position A, without a magnetic holding force produced by the coil section 17 being necessary for this purpose. The position A of the valve piston 9 or of the conical nipple 11 corresponds to the position A' of the magnet armature 18.

The current supply can be interrupted since the force acting against the conical nipple 11 necessary for the sealing action is applied by the holding device 19 alone.

By switching over the valve piston 9 into the switching position B, the entire coil which is formed from the coil sections 16 and 17 is acted on by the current such that the magnet armature 18 is aligned corresponding to the position B'. In this case, the forces exerted by the magnetic field on the magnet armature 18 act against the contact pressure of the holding device 19, with the result that the holding device 19 changes by switching over into the position shown by broken lines. After this position is reached, the current supply to the coil 15 can then again be interrupted since the conical nipple 10 of the valve piston 9 is alone pressed in the conical seat 13 by the contact pressure, now reversed in its sense of direction.

Figure 2:
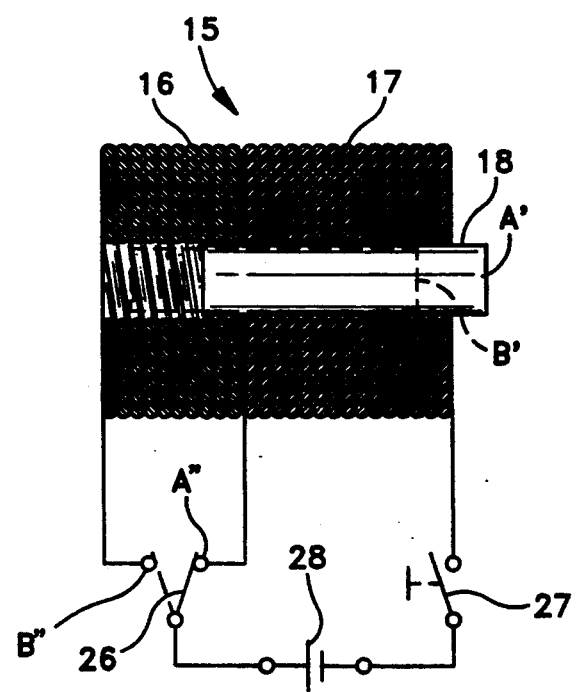
FIG. 2 is a representation of the electric wiring diagram for the operation of the solenoid used in the solenoid valve according FIG. 1.

FIG. 2 shows the representation of a wiring diagram for the partial or complete action by the current on the coil 15. In addition to the coil 15, the wiring diagram has a selective switch 26, a push button 27 and a power source 28 as essential components. Only the coil section 17 is acted on by the current in the switch position of the selective switch 26 designated as A". The position A' of the magnet armature 18 is hereby obtained which, as was already explained in detail by means of FIG. 1, corresponds to the switching position A of the valve piston 9. However, if the selective switch is shifted and is now in the switch position B", the entire coil 15 which is formed from the coil sections 16 and 17 is acted on by the current. Again, this results in the alignment of the magnet armature according to the position B' which corresponds to the switching position B of the valve piston 9. The positionings A' and B' of the magnet armature 18 mentioned are, of course, only possible with the push button 27 closed. A push button or a switching element having a similar action is suitable for closing the electric circuit since. As explained in detail in the explanations to FIG. 1 above, the closing of the electric circuit must only occur briefly in order to transport the valve piston 9 from one switching position into the other switching position. The holding of the valve piston 9 in the particular switching position is only obtained by the holding device 19.

Figure 3:
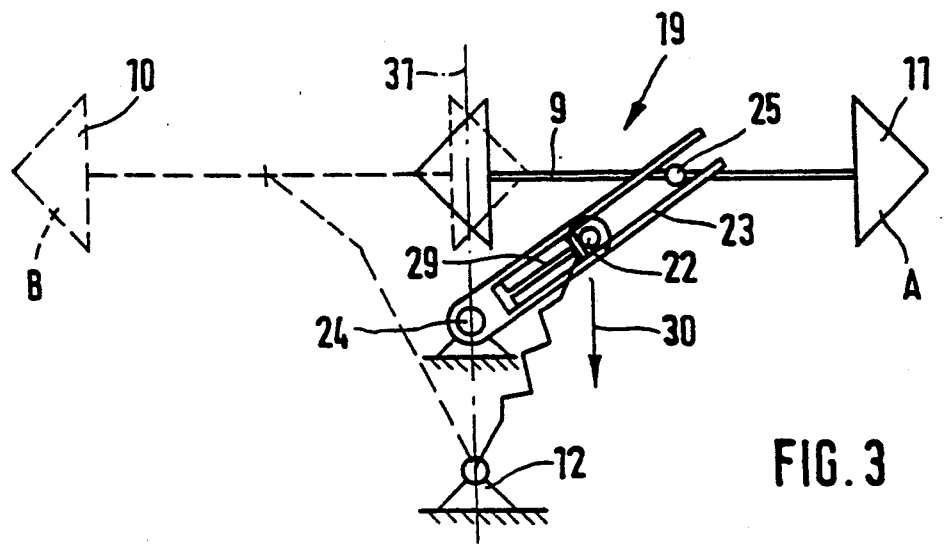
FIG. 3 is a basic diagram of a holding device provided with a tension spring used in the solenoid valve according to FIG. 1.
Figure 4:
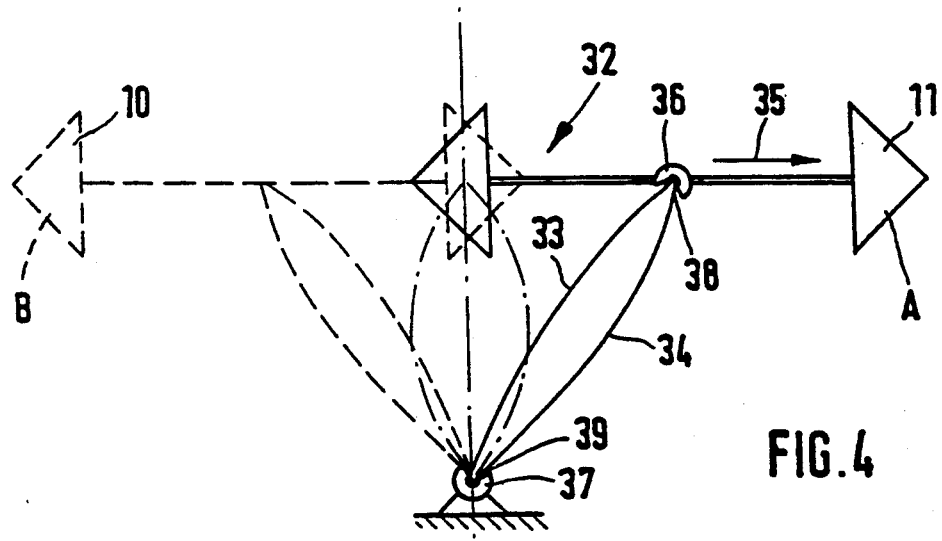
FIG. 4 is a basic diagram of a holding device provided with a pair of leaf springs.
Figure 5:
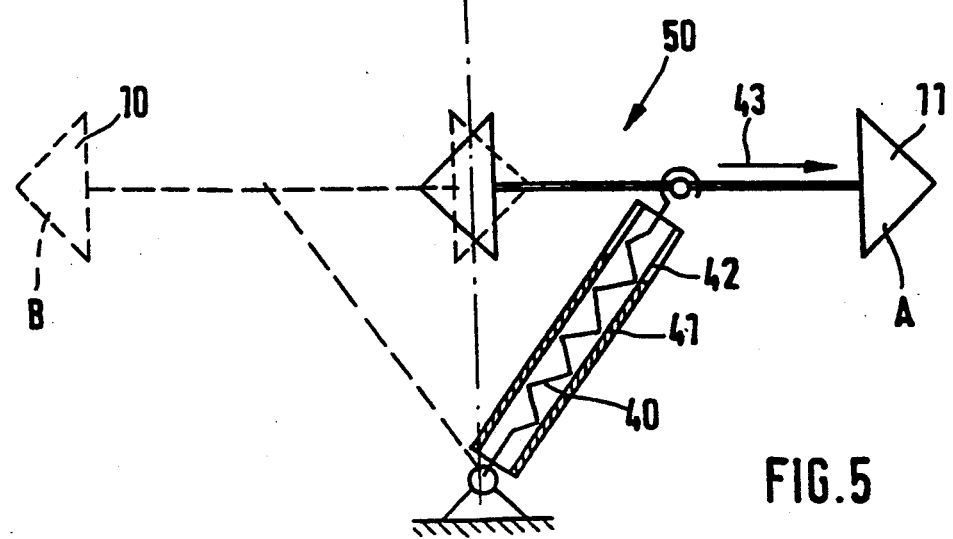
FIG. 5 is a basic diagram of a holding device provided with a compression spring arrangement.

Holding devices, which are different in construction and yet agree in their function, are represented in FIGS. 3 to 5. FIG. 3 shows, once again in highly schematic representation, the holding device 19 essentially constituting the tension spring 20 and the pivoted lever 23. The coupling of the pivoted lever 23 onto the swivel axis 24 and the coupling of the tension spring 20 onto the valve housing 12 are shown here by corresponding bearing symbols. Part of the pivoted lever 23 is an adjustable distance element 29 which is supported with its lower end on the pivoted lever 23. On the upper end of the distance element 29 lies the pin 22, on which the tension spring 20 is coupled and in which engages a vertically acting tension force component 30 of the tension spring force which effects a torque around the swivel axis 24. When changing the holding device 19 as a result of transferring the valve piston 9 from the switching position A to the switching position B, the holding device 19 passes a central position which is characterized by an unstable state of equilibrium. In this central position, the maximally extended tension spring 20 and the pivoted lever 23 are aligned on a common axis 31. With the approach of the holding device, starting from the switching position A, to the central position designated by the axis 31, the torque acting around the swivel axis 24 becomes increasingly smaller and approaches zero. After overcoming the central position, there is again a steady increase in the torque produced by the force component 30, which leads to the described safety of the valve piston 9 in the switching position B.

By means of the schematic diagram shown in FIG. 3 which shows the kinematic operations between the components of the holding device 19 during the transfer from one switching position to another switching position, it is clear that, viewed precisely, the force exerted by the solenoid 3 on the valve piston 9 is necessary only during half the switching path, that is, for the transfer of the valve piston 9 from one switching position to the central position. From this, it arises that the solenoid 3 needs to be acted on by the current only during an extremely short period of time which, again, results in a corresponding low power consumption.

FIG. 4 shows a holding device 32, in which are used two leaf springs 33 and 34 which are arranged in opposite directions. The arrangement in opposite directions of an equal number of leaf springs is necessary if one wishes to obtain equal forces acting only with opposed polarity signs on the conical nipple 10 or 11 in both switching positions A and B. Since the leaf springs 33, 34 essentially exert a force of pressure on the valve piston 9, there is no need, in this case, for a power transmission (as occurs in FIG. 3 through the action of the pivoted lever 24) in order to obtain a force component 35 which presses the conical nipple 11 in the switching position A into the conical seat 14. The dash-dot representation shows the leaf springs 33, 34 in the central position running along the axis 31, and the broken-line representation shows the arrangement of the leaf springs 33, 34 in the switching position B. For the secure retention of the leaf spring ends, a jointly pivoting pin 36, 37 is arranged in this exemplary embodiment both on the valve piston 9 and on the valve housing 12, which pin is provided with a retention slot 38, 39 for the guiding retention of the leaf spring ends.

FIG. 5 shows a holding device 40, which is essentially formed from a compression spring 41, which is retained by a buckling sleeve 41 to prevent its buckling. In its upper terminal area, the buckling sleeve 41 has a recess which is designed such that it does not collide with the valve piston 9 when pivoting through the central position. By using the compression spring 40, a force component 43 acting on the conical nipple 11 is also immediately produced as in the previous exemplary embodiment.

Figure 6:
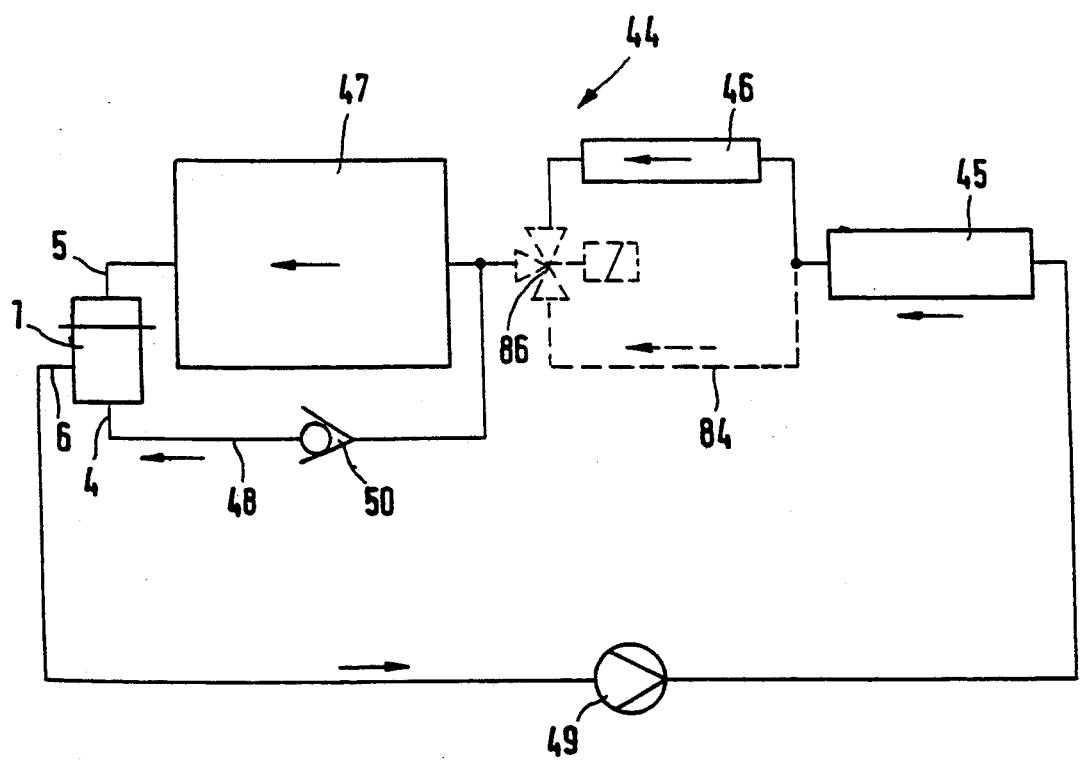

FIG. 6 shows the use of the solenoid valve 1 in a heatable coolant circulation 44 of a motor vehicle. The coolant circulation 44 shown in FIG. 6 essentially has, beginning with a heating device 45, the following components connected to one another according to the circulation line: the heating device 45 with combustion gas/coolant heat exchange present therein, a coolant-/air-preheater exchanger 46 for a vehicle interior, an internal combustion engine 47, a by-pass line 48 by-passing the internal combustion engine 47 with a nonreturn valve 50 arranged therein, the solenoid valve 1 on the junction of the by-pass line 48 behind the engine 47 in the coolant circulation 44, as well as a water pump 49 arranged in the return. Coolant, normally water or a water-glycol mixture, flows through the coolant circulation 44 in the operation in the above-mentioned sequence.

According to the switching position, the solenoid valve 1 makes it possible that the coolant, all in all, flows through the internal combustion engine 47, for example, for the fastest possible warming up of the engine under cold-start conditions, or that the coolant completely by-passes the internal combustion engine 47 through an opening of the valve path between the inlet 4 of the solenoid valve 1 and its outlet 6, for example, for the exclusive heating of the vehicle interior via the coolant/air-preheater exchanger 46.

Of course, in the exemplary use for the solenoid valve 1 according to the present invention described above, it is also possible to design the valve piston 9 of the solenoid valve 1 as a known valve-elastic material component. By means of this, with nonactuation of the solenoid valve 1, a normal operating thermostatic valve is obtained, with the option remaining open of overdriving the thermostatic valve by actuating the solenoid valve 1 and of guaranteeing an exclusive flowthrough of the internal combustion engine 47 or of the by-pass line 48, independent of the control area of the thermostatic valve, if necessary, through a corresponding switching position of the solenoid valve 1.

Also designed is a by-pass line 48, by-passing the coolant/air-preheater exchanger 46, which by-pass line 48 enters via a 3/2-distributing valve 86 into the remaining coolant circulation. The amount of coolant flowing through the heat exchanger 46 can be adjusted by the valve 86.

While specific embodiments of the invention have been shown and described in detail to illustrate the application of the principles of the invention, it will be understood that the invention may be embodied otherwise without departing from such principles.

What is claimed is:

1. An electric switching solenoid valve, comprising: a valve piston guided in a valve housing; a magnet armature connected to said piston and an electric coil for moving said valve piston from one switching position to another switching position by means of said magnet armature, said coil including coil areas which are assigned switching positions of the solenoid valve and being selectively acted on by current only during a switching operation; and holding means arranged in said valve housing for mechanically holding said valve piston in one of said switching positions, said holding means being formed by a mechanical holding device including a spring element connected between said valve housing and said valve piston, said spring being coupled at coupling points selected such that as the valve piston proceeds from one switching position to another switching position, said spring element is moved from one stable position, located at one switching position over an unstable central position, to another stable position located at another switching position, said spring element comprising two leaf springs, each of said leaf springs having a common coupling point at said valve housing and having a common coupling point at said valve piston, said leaf springs being compressed and extending outwardly in opposite directions.

2. A solenoid valve according to claim 1, wherein said valve housing forms a three/two distributing valve, said coil including two coil areas assigned to two switching positions of said solenoid valve.

3. A solenoid valve according to claim 1, wherein said valve housing is provided with two inlets and one outlet.

4. Electric switching solenoid valve, comprising: a housing defining a central chamber having three connection openings including a central connection opening and first and second side connection openings; an outlet connection connected to said central connection opening; a first inlet connection connected to one of said side openings, and a second inlet connection connected to another of said side openings; a valve piston extending through each of said first inlet connection, said central chamber and said second inlet connection; bearing members formed in each of said first inlet connection and said second inlet connection for supporting said piston for axial sliding movement of said piston relative to said bearing members; a magnet armature connected to said piston and an electric coil for moving said valve piston from one switching position to another switching position by means of said magnet armature, said coil including coil areas which are assigned switching positions of the solenoid valve and being selectively acted on by current only during a switching operation; a first valve element fixed to said piston and a second valve element fixed to said piston, said first valve element and said second valve element being spaced a predetermined distance apart and being movable with said piston, said the first side connection opening defining a valve seat for engagement with said first valve element in a first switching position, said second side connection opening defining a valve seat for engagement with said second valve element in a second switching position, said first valve element and said first side connection opening, said second valve element and said second side connection opening and each of said first inlet connection, second inlet connection, central chamber and said outlet connection cooperating to define a three/two distributing valve; and holding means positioned in said central chamber for mechanically holding said valve piston in one of said first switching position and said second switching position, said holding means including a spring element connected between said valve housing and said valve piston such that as said valve piston proceeds from one switching position to another switching position, said spring element is moved from one stable position, associated with a switching position, over an unstable central position, to another stable position associated with another switching position.

5. A solenoid valve according to claim 4, wherein said coil includes two coil sections that may be electrically coupled to one another, one coil area being assigned to a first switching position and being formed by a coil section and another coil area being assigned to a second switching position and being formed by an electric connection of both coil sections.

6. A solenoid valve according to claim 4, wherein said spring element is formed as a tension spring, one of said coupling points in said valve housing and another coupling point being a pivoted lever, said pivoted lever being coupled on said valve housing with a free end coupled to said valve piston via a slide ring connection.

7. A solenoid valve according to claim 4, wherein said spring element comprising two leaf springs, each of said leaf springs having a common coupling point at said valve housing and having a common coupling point at said valve piston, said leaf springs being compressed and extending outwardly in opposite directions.

8. A solenoid valve according to claim 4, wherein said spring element is formed as a compression spring arranged in a buckling sleeve.

9. A solenoid valve according to claim 4, further comprising in addition to a power source an essentially selective switch and a push button for optional activation of one or both coil sections.

10. A solenoid valve according to claim 4, further comprising a coolant circulation system connected to each of said first inlet, second inlet and outlet, said coolant circulation system including a heating device of an internal combustion engine for motor vehicles.

11. A solenoid valve according to claim 10, wherein said solenoid valve is a thermostatic valve, said valve piston being formed as a valve-elastic material component, said thermostatic valve being movable to two extreme positions independent of a situation of the valve-elastic material component, via coil sections of said coil, said coil sections being independently energizable by current.

12. Electric switching solenoid valve, comprising: a housing defining a central chamber having three connection openings including a central connection opening and first and second side connection openings; an outlet connection connected to said central connection opening; a first inlet connection connected to one of said side openings; and a second inlet connection connected to another of said side openings; a valve piston extending through each of said first inlet connection, said central chamber and said second inlet connection; bearing members formed in each of said first inlet connection and said second inlet connection for supporting said piston for axial sliding movement of said piston relative to said bearing members; a magnet armature connected to said piston and an electric coil for moving said valve piston from one switching position to another switching position by means of said magnet armature, said coil including coil areas which are assigned switching positions of the solenoid valve and being selectively acted on by current only during a switching operation; a first valve element fixed to said piston and a second valve element fixed to said piston, said first valve element and said second valve element being spaced a predetermined distance apart and being movable with said piston, said the first side connection opening defining a valve seat for engagement with said first valve element in a first switching position, said second side connection opening defining a valve seat for engagement with said second valve element in a second switching position, said first valve element and said first side connection opening, said second valve element and said second side connection opening and each of said first inlet connection, second inlet connection, central chamber and said outlet connection cooperating to define a three/two distributing valve; and holding means positioned in said central chamber for mechanically holding said valve piston in one of said first switching position and said second switching position, said holding means including a spring element connected between said valve housing and said valve piston such that as said valve piston proceeds from one switching position to another switching position, said spring element is moved from one stable position, associated with a switching position, over an unstable central position, to another stable position associated with another switching position, said spring element comprising two leaf springs, each of said leaf springs having a common coupling point at said valve housing and having a common coupling point at said piston, said leaf springs being compressed and extending outwardly in opposite directions.

* * * * *

UNITED STATES PATENT AND TRADEMARK OFFICE
CERTIFICATE OF CORRECTION

PATENT NO.  : 5,189,991
DATED       : March 2, 1993
INVENTOR(S) : Michael Humburg It is certified that error appears in the above-identified patent and that said Letters Patent is hereby corrected as shown below:

On the title page, item (73) should read--

Assignee:   J. Eberspächer, Esslingen,
                    Fed. Rep. of Germany
                               --.

Signed and Sealed this

Thirtieth Day of November, 1993

Attest:

BRUCE LEHMAN

*Attesting Officer*  *Commissioner of Patents and Trademarks*